Sept. 12, 1950   C. M. CARSON ET AL   2,522,346
METHOD OF PRODUCING TUBES FROM TWO HEAT-SEALABLE FILMS
Filed Dec. 27, 1947
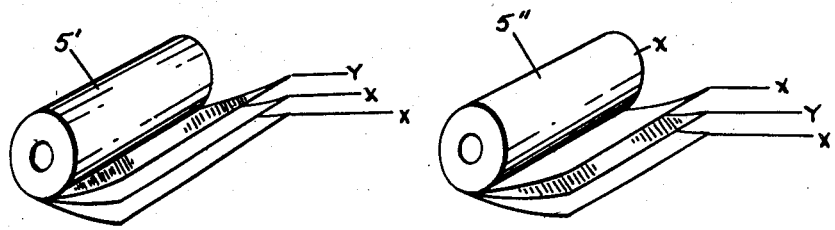
Fig. 1    Fig. 2
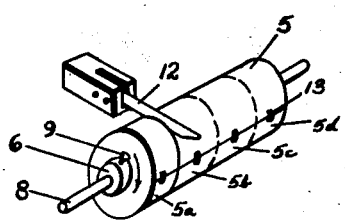
Fig. 3
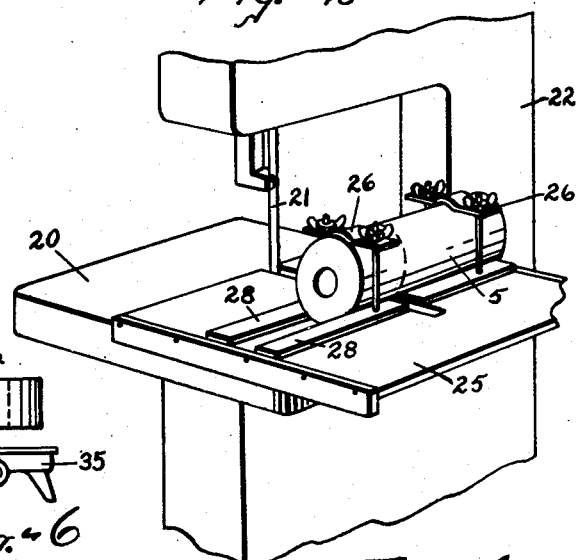
Fig. 4
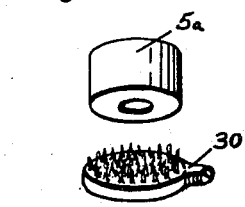
Fig. 5
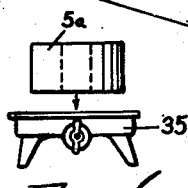
Fig. 6
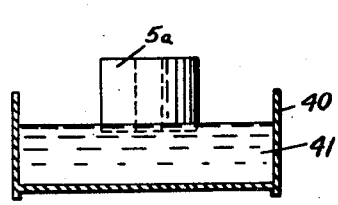
Fig. 7
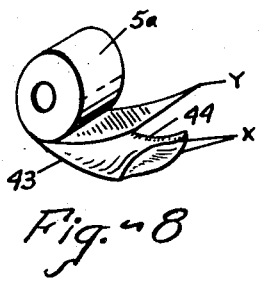
Fig. 9
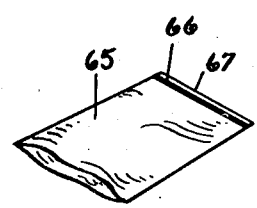
Fig. 8
Fig. 10
INVENTOR.
JAMES E. SNYDER and
CLARENCE M. CARSON
BY
R. H. Waters Patented Sept. 12, 1950

2,522,346

UNITED STATES PATENT OFFICE 2,522,346

METHOD OF PRODUCING TUBES FROM TWO HEAT-SEALABLE FILMS

Clarence M. Carson, Cuyahoga Falls, and James E. Snyder, Akron, Ohio, assignors to Wingfoot Corporation, Akron, Ohio, a corporation of Delaware Application December 27, 1947, Serial No. 794,158

9 Claims. (Cl. 154—116)

This invention relates to the manufacture of tubes, etc., from heat-sealable films. More particularly, it relates to the manufacture of tubes by applying heat to the opposite ends of a roll of such film and non-heat-sealable liner material in which each two plies of film are separated by a liner. It includes the process of heat-sealing the edges of plies of such film interlined with non-heat-sealable material by dipping the edges of the film and liner material into hot liquid such as molten metal or the like to unite contacting edges of the film while preventing union of film located on opposite sides of the liner material.

In the manufacture of tubes according to this invention, rolls are formed of long plies of material, in which two plies of heat-sealable film are separated by a liner of non-heat-sealable material. Ordinarily such rolls will be made of a width greater than that eventually desired, and these wide rolls will then be cut to rolls of the desired width. The ends of the rolls will then be heated in any desired manner, as by bringing them into contact with a heated plate or heating them over an open flame or dipping them into molten metal or other heated liquid. The heating of the ends of the rolls causes contacting edges of the film to become united, and the liner material prevents union of films separated by it. Thus, the opposite edges of each two plies of the film are united, forming a tube of any desired width. This tube may be used in any manner. It may, for example, be formed into envelopes.

The material used in carrying out the invention may advantageously be a transparent film material, such as, for example, film of rubber hydrochloride, copolymer of vinyl chloride and vinylidene chloride, polyethylene, etc. The liner material may be paper. The liner is the same width as the plies which are to be heat-sealed and the edges of the liner and film are in exact alignment, or the liner may be slightly wider than the film if the liner is thick enough to prevent edge contacts of the separated films. All such arrangements will be referred to in the claims as having the edges of the film and liner material in substantial alignment.

Rather recently there has been a demand for cast heat-sealable films which have been stretched. There are various reasons why stretched films are in demand. A chief reason is that stretched film gives greater coverage than unstretched film, and thus the cost of the film per unit coverage is decreased. Stretched films of elastoplastic material such as rubber hydrochloride, etc. shrink when heated. This may or may not be desirable. If two elastoplastic films which have been stretched laterally are formed into a tube, as contemplated by this invention, the tube will shrink circumferentially if heated. This may be desirable, as in forming a snug wrap around an article, by shrinking the tube to it. At other times, shrinking may be very objectionable, as when the tube is to be cut to envelopes, and the film has been stretched merely to give an envelope of film with very thin walls. Whether shrinkage of the film in the final package is desirable or not, it is undesirable to have the film shrink when the edges of the film are heated to seal them. The production of a tube from stretched elastoplastic film is advantageously carried out as herein contemplated, because shrinkage of the rolled film can easily be prevented. Longitudinal shrinkage merely increases the tightness of the roll. The tighter the film and liner are rolled, the less the shrinkage. Lateral shrinkage is prevented by rolling the film and liner material sufficiently tight. After sealing the edges of the film to form the tube, the material is kept in a tightly rolled condition until the seals become dimensionally stable. This prevents shrinkage when the tube and liner are unrolled.

Films of different materials or different thicknesses may be united to form tubes with walls of different composition, thickness, etc., so long as the two types of material seal to each other when heated under light pressure.

The invention will be further described in connection with the accompanying drawings, which are largely diagrammatic.

Figs. 1 and 2 are views in perspective of rolls formed of heat-sealable film separated by liner material;

Fig. 3 illustrates one method of cutting such rolls to a desired width;

Fig. 4 is a view in perspective of other means for cutting the rolls;

Figs. 5, 6 and 7 are views in perspective of different methods of heating the ends of the rolls;

Fig. 8 shows the tube formed in the process;

Fig. 9 illustrates means for cutting the tube to form envelopes therefrom; and

Fig. 10 is a view of a finished envelope.

The rolls 5' and 5" of Figs. 1 and 2 are formed from plies $x$ of the material which is to form tubes, with each two plies separated by a liner $y$. The plies $x$ may, for example, be of rubber hydrochloride film and the liner $y$ may be glassine paper. It is noted that all plies in both rolls are of uniform width. In forming the roll of Fig. 1 the liner $y$ is on one side of the two films $x$, $x$.

In forming the roll of Fig. 2 the liner y is between the two films x, x. The roll may be produced in either manner. In the finished roll each two plies of the film material are separated from adjacent plies by the liner.

Fig. 3 illustrates how the finished roll 5 may be cut into widths 5a, 5b, 5c and 5d. Cones 6 support the ends of the roll on the shaft 8. Setscrews 9 hold the cones in place. The shaft is connected with means for rotating it in the direction indicated by the arrow. The rotating roll is brought into pressure contact with the stationary knife 12. This cuts the long roll into the desired widths, as indicated. Patches of adhesive tape 13 prevent the individual rolls from becoming unrolled after the cutting operation. The shaft or core 8 may be of stiff fibrous material, such as cardboard or the like. In that event the cutting may be continued right through the core so that each of the narrow rolls is wound on a core of the same width as the film and liner. Any suitable means for producing the rolls and cutting them to width may be employed.

Fig. 4 illustrates a more elaborate device for cutting the rolls to desired widths. It comprises a table 20 through which the bandsaw 21 passes. The loop of the bandsaw is held in the housing 22, and means for operating the saw may also be enclosed in the housing. The roll 5 is fastened to the movable top 25 by suitable clamps 26. The cleats 28 facilitate clamping the roll to the top 25. With the bandsaw in operation, the top 25 is manually or mechanically moved to bring the roll against the bandsaw and thus cut it into widths. Instead of using a bandsaw a circular saw or knife blade may be similarly employed.

The drawings illustrate in a more or less diagrammatic manner means for cutting the roll to width. Such means is illustrative and the invention is not limited thereto, because the rolls may be cut to a desired width in any desired manner. Alternatively, the rolls may be produced from plies of film and liner material which are the desired width or which have been slit to the desired width, so that no cutting of the rolls is required.

Figs. 5, 6 and 7 illustrate different ways of heating the ends of the roll 5a. The means employed require heating first one end and then the other, although it is obvious that both ends may be heated simultaneously as by pressing heated plates against them.

Fig. 5 illustrates the method of heating with a gas or oil flame coming from the burner 30. Such a flame heats the exposed ends of the film and the film softens so rapidly that if a material such as paper is used as the liner the roll can be removed from the flame before damage is done to the paper. The end of the roll 5a need not be brought into contact with the flame but may simply be brought into proximity to it to effect the desired heating. The pressure of the plies in the roll, one on another, causes the heated edges of the film to become welded together.

Fig. 6 illustrates an ordinary laboratory electric hot plate 35 used to heat one end of the roll 5a. The arrow indicates that the end of the roll will ordinarily be brought into contact with the hot plate. First one end of the roll will be heated and then the other. Using two hot plates the ends may be heated simultaneously. The edges of the film are thus united and a tube is formed.

Fig. 7 shows a preferred method of heating. The tank 40 holds molten metal 41. This metal will be heated in any desirable manner, as by applying a flame to the bottom of the tank or embedding heating coils in the tank or continuously circulating the molten metal from the tank through suitable heating means and returning it to the tank. The method of heating with molten metal or other heated liquid is to be preferred to heating with a hot plate such as illustrated in Fig. 6 because the liquid flows up into the end of a roll and insures contact with all the film edges, even though the end of the roll is not perfectly flat. Likewise, if the material tends to shrink on heating, the liquid can follow it as it shrinks. The flame illustrated in Fig. 5 is similarly superior to the use of a heated plate, such as the hot plate 35 of Fig. 6, because the flame and hot gases from it ascend up into the end of the roll, and may enter the roll beyond any protruding portion of the roll end. However, the temperature of the flame cannot be as easily controlled as the temperature of a heated liquid. Thus, heated liquid is preferred as a means for heat-sealing the edges of plies of heat-sealable film separated by liners.

Fig. 8 illustrates the finished tube and liner y, partially unrolled. The opposite edges of the films x, x are united by the longitudinal heat-seals 43 and 44.

Fig. 9 illustrates quite diagrammatically how such tube material may be manufactured into envelopes. The tube 46 and the liner y are unrolled from the tube 5a. The liner is rolled up into the roll 48. The tube is drawn from the roll 5a by the bite rolls 50 and fed between the reciprocating elements 52 and 53. These elements contain the two parts of the shears 55 and heat-sealer 56. The rotation of the bite rolls and also the rotation of the snap rolls 60 is coordinated with the reciprocation of the elements 52 and 53, so that each time these elements are separated the amount of tube required for an envelope is fed between them by the bite rolls. As the elements 52 and 53 come together the shears 55 cut off a given length 65 of the tube material and the heating elements 56 seal the end of this length of tube nearest the shears. Fig. 10 shows the finished envelope 65 with the heat-seal 66 adjacent the edge 67. The shears 55 cut along the edge 67 at the same time the heat-seal 66 is formed by the heat-sealing elements 56. As the elements 52 and 53 separate, the snap rolls 60 feed the finished envelope on to the stacker 70.

The invention forms a novel method of forming long tubes from heat-sealable film which is difficult of accomplishment by methods heretofore devised. These tubes may be formed into envelopes or they may be used in any desired manner. The specification and drawings are illustrative. The invention is defined in the claims which follow.

What we claim is:

1. The method of forming tubes from films of heat-sealable material which comprises rolling up at least two plies of heat-sealable film with a non-heat-sealable liner between each two plies of the heat-sealable film, with the edges of the film and liner material in substantial alignment, heating the edges of the roll so as to unite contacting edges of the film, the presence of the liner preventing union of the edges of film separated by the liner, whereby the edges of each two plies of the film are separately united to form a tube of the film material.

2. The method of forming tubes from stretched films of heat-sealable, elastoplastic material which comprises rolling up at least two plies of such film with a non-heat-sealable liner between each two plies of the film, the film and liner material being rolled so tightly as to prevent appreciable shrinkage of the stretched film when heated, the film and liner being rolled with their edges in substantial alignment, heating the edges of the roll so as to unite contacting edges of the film, the presence of the liner preventing union of the edges of film separated by the liner, whereby the edges of each two plies of the film are separately united to form a tube of the stretched film.

3. The method of producing a tube of heat-sealable film from two plies of the film and a liner of non-heat-sealable material which comprises rolling the two plies with the liner into a roll with the respective edges of the plies and liner in substantial alignment so that throughout the roll each two thicknesses of the film material are separated by the liner, heating the ends of the roll to unite contacting edges of the film to form a tube while preventing the union of film on opposite sides of the liner.

4. The method of producing tubes of heat-sealable film which comprises cutting into narrower widths a roll of heat-sealable films and non-heat-sealable liner formed with each two plies of film separated by liner, and then heating the ends of the narrower rolls to join the contacting edges of the film material while preventing the union of the edges of more than two plies of film by the presence of the liner.

5. The method of forming a tube which comprises heating opposite edges of two adjacent strips of rolled heat-sealable film while bounded radially by non-heat-sealable material.

6. The method of forming a tube from two plies of heat-sealable film rolled with a liner of non-heat-sealable material between each two plies of the film, with the edges of the film and liner in substantial alignment, which comprises dipping each end of the roll into heated liquid to heat contacting edges of the film and thereby causing them to unite while preventing the union of the edges of more than two plies of the film by the presence of the liner.

7. The method of uniting contacting edges of heat-sealable film separated from other contacting edges of heat-sealable film by non-heat-sealable liner material, with the contacting edges and an edge of the liner material in substantial alignment, which comprises dipping said edges tightly pressed together into heated liquid to seal the edges of the film material together while preventing the union of films separated by the liner.

8. The method of uniting contacting edges of heat-sealable film, which comprises pressing together pairs of films, each pair being separated by a non-heat-sealable liner, with the edges of the films and liners in substantial alignment, and dipping said edges into a bath of molten metal and thereby sealing together contacting edges of the films while preventing the union of films on opposite sides of the liner.

9. The method of uniting contacting edges of stretched, heat-sealable, elastoplastic film material, which comprises pressing together pairs of such film, each pair being separated by a non-heat-sealable liner, the films and liner being pressed together tightly so as to prevent appreciable shrinkage of the film on heating, the edges of the film and liner being in substantial alignment, and dipping said edges into a heated liquid and thereby sealing together contacting edges of the films while preventing the union of films on opposite sides of the liner.

CLARENCE M. CARSON.
JAMES E. SNYDER.

REFERENCES CITED

The following references are of record in the file of this patent:

UNITED STATES PATENTS

| Number | Name | Date |
| --- | --- | --- |
| 2,117,452 | Robinson et al. | May 27, 1938 |
| 2,232,640 | Schwartzman | Feb. 18, 1941 |
| 2,259,239 | Brown et al. | Oct. 14, 1941 |
| 2,273,452 | Snyder | Feb. 17, 1942 |
| 2,423,237 | Haslacher | July 1, 1947 |
| 2,431,050 | Kopplin | Nov. 18, 1947 |
| 2,440,664 | Irons | Apr. 27, 1948 |